US006916759B2

(12) United States Patent
Yang et al.

(10) Patent No.: US 6,916,759 B2
(45) Date of Patent: Jul. 12, 2005

(54) METHOD FOR PRODUCING A CATALYST FOR HOMO-OR CO-POLYMERIZATION OF ETHYLENE

(75) Inventors: Chun-Byung Yang, Daejon (KR); Won-Young Kim, Daejon (KR); Weon Lee, Daejon (KR)

(73) Assignee: Samsung Atofina Co., Ltd., ChungNam (KR)

( * ) Notice: Subject to any disclaimer, the term of this patent is extended or adjusted under 35 U.S.C. 154(b) by 0 days.

(21) Appl. No.: 10/416,428

(22) PCT Filed: Nov. 9, 2001

(86) PCT No.: PCT/KR01/01904

§ 371 (c)(1),
(2), (4) Date: Oct. 20, 2003

(87) PCT Pub. No.: WO02/38619

PCT Pub. Date: May 16, 2002

(65) Prior Publication Data

US 2004/0116278 A1 Jun. 17, 2004

(30) Foreign Application Priority Data

Nov. 9, 2000 (KR) ..................... 2000-0066411

(51) Int. Cl.⁷ .................... B01J 31/00; B01J 37/00; C08F 4/02; C08F 4/60
(52) U.S. Cl. .................... 502/125; 502/118; 502/127; 502/128; 502/134
(58) Field of Search ................ 502/118, 125, 502/127, 128, 134, 150, 158, 159, 169, 171, 172

(56) References Cited

U.S. PATENT DOCUMENTS

| 3,332,927 A | 7/1967 | Cottingham |
| 3,632,620 A | 1/1972 | Kober et al. |
| 3,642,746 A | 2/1972 | Kashiwa et al. |

(Continued)

FOREIGN PATENT DOCUMENTS

| DE | 2553104 | 6/1977 |
| DE | 3636060 | 5/1988 |
| EP | 0 008 307 | 3/1980 |
| EP | 0131832 | 7/1984 |
| EP | 0350170 | 1/1990 |
| EP | 0385765 | 9/1990 |
| EP | 0 391 336 | 10/1990 |
| EP | 0602922 | 6/1994 |
| EP | 0607703 | 7/1994 |
| EP | 0669347 | 8/1995 |
| EP | 0606125 | 7/1997 |
| GB | 1335887 | 10/1973 |
| GB | 1492618 | 1/1975 |
| GB | 1577643 | 10/1980 |
| JP | 51136625 | 11/1976 |
| JP | 52111528 | 9/1977 |
| JP | 59-064602 | 4/1984 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-191811 | 9/1988 |
| JP | 63-54004 | 10/1988 |
| JP | 63308003 | 12/1988 |
| JP | 1242605 | 9/1989 |
| JP | 2240145 | 9/1990 |

(Continued)

OTHER PUBLICATIONS

Wen et al. "Mechanics of Fluidzation" Chemical Engineering Progress Symposium Series, 1962, vol. 62, 100–111.

Edelmann, "N–silylated benzamidines: versatile building blocks in main group and coordination chemistry," Coordination Chemistry Reviews, vol. 137, 1994, pp. 403–481.

Stokes et al., "Reactions of Cobaloxime Anions and/or Hydrides with Enyneas as a New, General Route to 1, 3– and 1,2–Dienylcobaloxime Complexes," Organometallics, 1996, vol. 15, pp. 2624–2632.

Zhou et al., "Synthesis and Structure of Novel Bridged Dinuclear Indium Complexes," Inorg. Chem., 1996, vol. 35, pp. 1423–1424.

Tinkler et al., "Polymerisation of ethene by novel titanium complex [Ti(Me3SiNCH2CH2NsiMe3)CI2]; a metallocene analogue," Chem. Commun., 1996, pp. 2623–2624.

Linden et al., "Polymerization of a–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Zhou et al., "Bulky Amidinate Complexes of Tin(IV). Synthesis and Structure of Sn(RNC(R ')NR)2CC (R=Cyclohexyl, R '=H, Me; R=SiMe3, R '=tBu)," Inorg. Chem., 1997, vol. 36, pp. 501–504.

Averbuj et al. "Stereoregular Polymerization of a–Olefins Catalyzed by Chiral Group 4 Benzamidinate Complexes of C1 and C3 Symmetry" J. Am. Chem. Soc, 1998, vol. 120, 8640–8646.

International Search Report PCT/KR01/01904, mailed Jan. 10, 2002.

*Primary Examiner*—Mark L. Bell
*Assistant Examiner*—J. Pasterczyk
(74) *Attorney, Agent, or Firm*—Meyertons, Hood, Kivlin, Kowert & Goetzel, P.C.; Eric B. Meyertons

(57) ABSTRACT

A method of making an olefin polymerization catalyst is disclosed. The method involves contacting a magnesium halide compound with an alcohol, adding a mineral oil to the product, reacting this product with a hydroxylated ester and an alkoxy silane, then adding a titanium compound and a second silicon compound. The titanium compound is preferably an alkoxy halide, and the second silicon compound is preferably a silicon halide.

12 Claims, No Drawings

U.S. PATENT DOCUMENTS

| | | |
|---|---|---|
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scatt et al. |
| 4,226,963 A | 10/1980 | Giannini et al. |
| 4,235,747 A | 11/1980 | Leung |
| 4,263,169 A | 4/1981 | Scata et al. |
| 4,277,372 A | 7/1981 | Matlack |
| 4,315,835 A | 2/1982 | Scatt et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,390,671 A | 6/1983 | Imai et al. |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,615,831 A | 10/1986 | Kanno et al. |
| 4,642,328 A | 2/1987 | Morterol et al. |
| 4,673,719 A | 6/1987 | Kioka et al. |
| 4,729,854 A | 3/1988 | Miyata et al. |
| 4,761,392 A | 8/1988 | Shiga et al. |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbe |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,021,382 A | 6/1991 | Malpass, Jr. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,218,052 A | 6/1993 | Cohen et al. |
| 5,244,996 A | 9/1993 | Kawasaki et al. |
| 5,346,872 A | 9/1994 | Menon et al. |
| 5,438,110 A | 8/1995 | Ishimaru et al. |
| 5,439,995 A | 8/1995 | Bailly et al. |
| 5,455,316 A | 10/1995 | Tsutsui et al. |
| 5,459,116 A | 10/1995 | Ro et al. |
| 5,498,770 A | 3/1996 | Hosaka et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,618,886 A | 4/1997 | Shinozaki et al. |
| 5,629,390 A | 5/1997 | Nishimura et al. |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,877,265 A | 3/1999 | Toida et al. |
| 5,880,056 A | 3/1999 | Tsutsui et al. |
| 5,936,049 A | 8/1999 | Kojoh et al. |
| 5,948,872 A | 9/1999 | Kioka et al. |
| 5,965,478 A | 10/1999 | Goto et al. |
| 5,968,862 A | 10/1999 | Abbott et al. |
| 6,028,149 A | 2/2000 | Luciani et al. |
| 6,034,025 A | 3/2000 | Yang et al. |
| 6,066,702 A | 5/2000 | Ro et al. |
| 6,111,038 A | 8/2000 | Kioka et al. |
| 6,114,276 A | 9/2000 | Kong et al. |
| 6,214,759 B1 | 4/2001 | Chang et al. |
| 6,218,331 B1 | 4/2001 | DeMaio et al. |
| 6,235,854 B1 | 5/2001 | Kioka et al. |
| 6,291,385 B1 | 9/2001 | Lee et al. |
| 6,323,150 B1 | 11/2001 | Kojoh et al. |
| 6,482,764 B1 | 11/2002 | Chang et al. |
| 6,521,560 B1 | 2/2003 | Kojoh et al. |
| 6,537,942 B2 | 3/2003 | Shinozaki et al. |
| 6,559,250 B2 | 5/2003 | Ro et al. |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Ro et al. |

FOREIGN PATENT DOCUMENTS

| | | |
|---|---|---|
| JP | 2-300206 | 12/1990 |
| JP | 06-340711 | 5/1993 |
| JP | 07-330675 | 8/1995 |
| JP | 7242706 | 9/1995 |
| JP | 8109215 | 4/1996 |
| JP | 9165478 | 6/1997 |
| JP | 09176226 | 7/1997 |
| JP | 2000191845 | 7/2000 |
| KR | 1020010084520 | 9/2001 |
| WO | WO 9844009 | 10/1998 |
| WO | WO 00/73355 | 7/2000 |
| WO | WO 01/32718 | 5/2001 |
| WO | WO 01/78687 | 10/2001 |

| | | | | | | |
|---|---|---|---|---|---|---|
| WO | WO 02/38620 | 5/2002 | | WO | WO 02/051882 | 7/2002 |
| WO | WO 02/38622 | 5/2002 | | WO | WO 02/051933 | 7/2002 |
| WO | WO 02/38623 | 5/2002 | | WO | WO 02/051934 | 7/2002 |
| WO | WO 02/38624 | 5/2002 | | WO | WO 02/052059 | 7/2002 |
| WO | WO 02/48206 | 6/2002 | | WO | WO 03/000747 | 3/2003 |

METHOD FOR PRODUCING A CATALYST FOR HOMO-OR CO-POLYMERIZATION OF ETHYLENE

BACKGROUND

1. Field of the Invention

The present invention provides a method for producing a catalyst for homo-polymerization or co-polymerization of ethylene, or more particularly a method for producing a high-activity titanium solid complex catalyst supported on a carrier containing magnesium, wherein said catalyst is capable of producing polymers with high bulk densities and narrow particle size distributions with a low content of fine particles.

2. Description of Related Art

Catalysts containing magnesium for polymerization or co-polymerization of ethylene are known to have very high catalytic activities and to produce polymers with a high bulk density. These catalysts are suitable for liquid phase or gas phase polymerization. Liquid phase polymerization of ethylene denotes a polymerization process performed in a medium such as bulk ethylene, isopentane, or hexane. One of the important characteristics of catalysts used in this process is catalytic activity. The characteristics of the catalyst will also affect bulk density of the resultant polymers, content of low molecular weight molecules of the resultant polymers dissolved in a medium, particle size distribution of the resultant polymers, and content of fine particles in the resultant polymers.

Many titanium-based catalysts containing magnesium for olefin polymerization, and the manufacturing methods thereof have been reported. Many processes using magnesium solutions to produce catalysts that can generate olefin polymers with a high bulk density are known. A magnesium solution may be obtained by reacting magnesium compounds with electron donors such as alcohols, amines, cyclic ethers, or organic carboxylic acids in the presence of a hydrocarbon solvent. Examples using an alcohol are disclosed in U.S. Pat. Nos. 3,642,746; 4,336,360; 4,330,649; and 5,106,807. Further, methods for production of catalysts containing magnesium by reacting the said liquid-phase magnesium solution with a halogenated compound such as titanium tetrachloride are well known. Such catalysts produce high bulk density polymers, but there are still improvements yet to be made with respect to catalytic activity and hydrogen reactivity. Moreover, tetrahydrofuran, a cyclic ester, has been used as a solvent for a magnesium compound in U.S. Pat. Nos. 4,477,639 and 4,518,706.

U.S. Pat. Nos. 4,847,227; 4,816,433; 4,829,037; 4,970,186; and 5,130,284 teach the use of electron donors such as dialkylphthalate, phthaloyl chloride, etc. for reaction with a titanium chloride compound in the production of olefin polymerization catalysts exhibiting superior polymerization activity, and which are capable of enhancing the bulk density of the resultant polymers.

U.S. Pat. No. 5,459,116 teaches a method of product of a titanium solid catalyst by contact-reacting a magnesium solution containing an ester having at least one hydroxyl group as an electron donor with a titanium compound. By this method, a catalyst of high polymerization activity was obtained, which produces polymers with a high bulk density but there is still room for more improvement.

There is a need for the development of new catalysts for homo-polymerization or co-polymerization of ethylene for producing polymers. The catalyst should have the following characteristics: be produced by a simple manufacturing process, exhibit a high polymerization activity, produce high bulk density polymers by means of controlling catalyst particle size, and in particular, produce a polymer with a narrow particle size distribution containing few fine particles. It is intended to provide a method of producing, from low-cost compounds via a simple process, a catalyst having excellent catalytic activity capable of producing polymers with high bulk densities and narrow particle size distributions containing few fine particles.

SUMMARY

A method is disclosed for producing a catalyst for homo-polymerization or co-polymerization of ethylene, wherein said catalyst has a high catalytic activity and is capable of producing polymers with a high bulk density and a narrow particle size distribution with few fine particles. The method provides a simple process for producing a catalyst for homo-polymerization or co-polymerization of ethylene. Objectives and the utility of the present invention will become apparent as references are made with respect to the following descriptions and the claims thereto.

DETAILED DESCRIPTION

The catalyst for homo-polymerization or co-polymerization of ethylene is produced by a simple yet efficient manufacturing process, which includes:

(i) preparing a magnesium solution by contact-reacting a halogenated magnesium compound with an alcohol and adding mineral oil to adjust the viscosity of said magnesium solution;

(ii) reacting said solution with an ester compound having at least one hydroxyl group and a silicon compound having at least one alkoxy group; and (iii) producing a solid titanium catalyst by adding a mixture of a titanium compound and a silicon compound.

The types of halogenated magnesium compounds used include di-halogenated magnesiums such as magnesium chloride, magnesium iodide, magnesium fluoride, and magnesium bromide; alkymagnesium halides such as methylmagnesium halide, ethylmagnesium halide, propylmagnesium halide, butylmagnesium halide, isobutylmagnesium halide, hexylmagnesium halide, and amylmagnesium halide; alkoxymagnesium halides such as methoxymagnesium halide, ethoxymagensium halide, isopropoxymagnesium halide, butoxymagnesium halide, octoxymagnesium halide; and aryloxymagnesium halides such as phenoxymagnesium halide and methyl-phenoxymagnesium halide. Of the above magnesium compounds, two or more compounds can be used in a mixture. Further, the above magnesium compounds can be effectively used in the form of a complex compound with other metals.

Of the compounds listed above, some can be represented by a simple formula; however, others cannot depending on the production methods of the magnesium compounds. In the latter cases, the magnesium compounds can generally be regarded as a mixture of some of the listed compounds. For example, compounds that can be used include compounds obtained by reacting magnesium compounds with polysiloxane compounds, silane compounds containing halogen, ester, or alcohol; and compounds obtained by reacting magnesium metals with alcohol, phenol, or ether in the presence of halosilane, phosphorus pentachloride, or thionyl chloride. However, the preferable magnesium compounds are magnesium halides, especially magnesium chloride or alkylmagnesium chloride, preferably those having an alkyl group of 1–10 carbons; alkoxymagnesium chlorides, preferably those having 1–10 carbons; and aryloxymagnesium chlorides, preferably those having 6–20 carbons. The magnesium solution used can be produced as a solution by using the aforementioned magnesium compounds in the presence a hydrocarbon solvent or in the absence thereof, in an alcohol solvent.

The types of hydrocarbon solvents used include aliphatic hydrocarbons such as pentane, hexane, heptane, octane, decane, and kerosene; alicyclic hydrocarbons such as cyclopentane, methylcyclopentane, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When a magnesium compound is converted into a magnesium solution, alcohol is used in the presence of the aforementioned hydrocarbons or in the absence thereof. The types of alcohol include those containing 1–20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, although an alcohol containing 1–12 carbon atoms is preferable. The average size of a target catalyst and its particle size distribution can vary according to the type and content of alcohol used, the types of magnesium compounds used, the ratio of magnesium to alcohol, etc. Nevertheless, the total amount of alcohol required to obtain the magnesium solution is at least 0.5 mole per mole of magnesium compound, preferably about 1.0–20 moles, or more preferably about 2.0–10 moles.

During the production of magnesium solution, the reaction of a magnesium compound with an alcohol is preferably carried out in the presence of a hydrocarbon medium. The reaction temperature, while variable depending on the types and amount of alcohol used, is at least about −25° C., preferably −10–200° C., or more preferably about 0–150° C. It is preferable to carry out the reaction for about 15 minutes to 5 hours, preferably for about 30 minutes to 4 hours.

Mineral oil is used to adjust the viscosity of the magnesium solution produced. By adjusting the viscosity of the magnesium solution, the shape and particle size distribution of the catalyst can be more easily controlled. Accordingly, it was discovered that, by using said catalyst, the bulk density and the particle size distribution of the resultant polymers could be improved.

The types of mineral oil that can be used include white oil, paraffinic hydrocarbon oil (e.g., Nujol), or silicone oil. The viscosity of the mineral oil is about 5–85 centistoke at 40° C., or preferably 60–75 centistoke at 40° C.

The ester compounds having at least one hydroxyl group used as electron donors include unsaturated aliphatic acid esters having at least one hydroxyl group, such as 2-hydroxy ethylacrylate, 2-hydroxy ethylmethacrylate, 2-hydroxypropyl acrylate, 2-hydroxypropylmethacrylate, 4-hydroxy butylacrylate, and pentaerythritol triacrylate; aliphatic monoesters or polyesters having at least one hydroxyl group, such as 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate; isobutyl lactate, ethyl mandelate, dimethyl ethyl tartrate, ethyl tartrate, dibutyl tartrate, diethyl citrate, triethyl citrate, ethyl-2-hydroxy-caproate, and diethyl bis-(hydroxy methyl) malonate; aromatic esters having at least one hydroxyl group, such as 2-hydroxy ethyl benzoate, 2-hydroxy ethyl salicylate, methyl-4-(hydroxy methyl) benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthanoate, monoethylene glycol monobenzoate, diethylene glycol monobenzoate, and triethylene glycol monobenzoate; alicyclic esters having at least one hydroxyl group, such as hydroxybutyl lactone, and others. The amount of the ester compound having at least one hydroxyl group should be about 0.001–5 moles per mole of magnesium, or preferably about 0.01–2 moles per mole of magnesium.

The silicon compound having at least one alkoxy group, which can be used as another electron donor, is represented by the general formula of $R_nSi(OR)_{4-n}$ (where R is a hydrocarbon having 1–12 carbons and n is a natural number from 0 to 3). In particular, the following compounds can be used: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane, etc. The amount of said compound to be used is preferably about 0.05–3 moles per mole of magnesium, or more preferably about 0.1–2 moles per mole of magnesium.

The contact-reaction of the magnesium solution with an ester compound having at least one hydroxyl group and an alkoxy silicon compound may be performed at a temperature of about 0–100° C., or more preferably at a temperature of about 10–70° C.

To recrystalize the catalyst particles, the magnesium compound solution is reacted with a mixture of a liquid titanium compound represented by the general formula of $Ti(OR)_aX_{4-a}$ (where R is a hydrocarbon group, X is a halogen atom, and a is a natural number from 0 to 4) and a compound represented by the general formula of $R_nSiCl_{4-n}$ (where R is hydrogen, or an alkyl, an alkoxy, haloalkyl, or aryl group having 1–10 carbons, or a halosilyl or a halosilylalkyl group having 1–8 carbons and n is a natural number from 0 to 3). In the general formula, R is an alkyl group having 1–10 carbon atoms.

The types of titanium compounds which satisfy the general formula include a 4-halogenated titanium such as $TiCl_4$, $TiBr_4$, and $TiI_4$; a 3-halogenated alkoxy-titanium such as $Ti(OCH_3)Cl_3$, $Ti(OC_2H_5)Cl_3$, $Ti(OC_2H_5)Br_3$, and $Ti(O(i-C_4H_9))Br_3$; a 2-halogenated alkoxy-titanium such as $Ti(OCH_3)_2Cl_2$, $Ti(OC_2H_5)_2Cl_2$, $Ti(O(i-C_4H_9))_2Cl_2$, and $Ti(OC_2H_5)_2Br_2$; and a tetra-alkoxy titanium such as $Ti(OCH_3)_4$, $Ti(OC_2H_5)_4$, and $Ti(OC_4H_9)_4$. A mixture of the above titanium compounds can also be used. However, the preferable titanium compounds are those containing halogen, or more preferably titanium tetrachloride.

The types of silicon compounds satisfying the above general formula of $R_nSiCl_{4-n}$ (where R is hydrogen, or an alkyl, an alkoxy, haloalkyl, or aryl group having 1–10 carbons, or a halosilyl or a halosilylalkyl group having 1–8 carbons and n is a natural number from 0 to 3) include silicon tetrachloride; trichlorosilanes such as methyltrichlorosilane, ethyltrichlorosilane, phenyltrichlorosilane; dichlorosilanes such as dimethyldichlorosilane, diethyldichlorosilane, di-phenyldichlorosilane, and methylphenyldichlorosilane; monochlorosilanes such as trimethylchlorosilane. A mixture of these silicon compounds can also be used, or more preferably silicon tetrachloride can be used.

The amount of the mixture of a titanium compound and a silicon compound used during re-crystallization of the magnesium compound solution is about 0.1–200 moles per mole of magnesium compound, preferably about 0.1–100 moles per mole of magnesium compound, or more preferably about 0.2–80 moles per mole of magnesium compound. The molar ratio of the titanium compound to the silicon compound in mixture is about 1:0.05–1:0.95, or more preferably about 1:0.1–1:0.8.

When the magnesium compound solution is reacted with the mixture of a titanium compound and a silicon compound, the shapes and sizes of the re-crystallized solid constituents vary a great deal according to the reaction conditions. Hence, the reaction of the magnesium compound solution with the mixture of a titanium compound and a silicon compound should be carried out preferably at a sufficiently low temperature to result in formation of solid constituents. More preferably, the reaction should be carried out by contact-reaction at about −70–70° C., or most preferably at about −50–50° C. After the contact-reaction, the temperature is slowly raised over a period of about 0.5–5 hours to a temperature of about 50–150° C.

The particles of solid catalyst obtained during the above process can be further reacted with titanium compounds. These titanium compounds include titanium halides or halogenated alkoxy titaniums with an alkoxy functional group of 1–20 carbons. At times, a mixture of these compounds can also be used. Of these compounds, however, a titanium halide or a halogenated alkoxy titanium compound having an alkoxy functional group of 1–8 carbons can be appropriately used, or more preferably a titanium tetrahalide can be used.

The catalyst produced according to the process can be utilized for homo- or co-polymerization of ethylene. In particular, the catalyst is used in homo-polymerization of ethylene, and also in co-polymerization of ethylene and α-olefins having three or more carbons such as propylene, 1-butene, 1-pentene, 4-methyl-1-pentene, or 1-hexene.

The polymerization reaction performed with the catalyst is carried out using:
(i) a solid complex titanium catalyst, including magnesium, titanium, halogen, and an electron donor; and
(ii) a catalyst system including organometallic compounds of Groups II or III of the Periodic Table.

The solid complex titanium catalyst constituent can be used as a component in the polymerization reaction after pre-polymerization with ethylene or an α-olefin. The pre-polymerization can be performed in the presence of a hydrocarbon solvent such as hexane, at a sufficiently low temperature or with ethylene or an α-olefin under pressure, in the presence of the above catalyst constituent and an organo aluminum compound such as triethylaluminum. The pre-polymerization controls the shape of the catalyst particles by surrounding the catalyst particles with polymer. The control of particle shape is helpful in producing good-quality post-polymerization shapes of polymer product. The weight ratio of polymer to catalyst after pre-polymerization is ordinarily about 0.1:1–20:1.

The organometallic compound can be represented by the general formula of $MR_n$, where M represents a metal constituent of Group II or IIIA in the Periodic Table, such as magnesium, calcium, zinc, boron, aluminum, and gallium, R represents an alkyl group with 1–20 carbons, such as a methyl, ethyl, butyl, hexyl, octyl, or decyl group, and n represents the atomic valence of the metal constituent. Preferable organometallic compounds include trialkyl aluminums having an alkyl group of 1–6 carbons, such as triethylaluminum and triisobutylaluminum, or a mixture thereof. On occasion, an organo aluminum compound having one or more halogens or hydride groups, such as ethylaluminum dichloride, diethylaluminum chloride, ethylaluminum sesquichloride, or diisobutylaluminum hydride can also be used.

The polymerization reaction may be performed in either the gas phase or as a bulk polymerization in the absence of an organic solvent, or as a liquid phase slurry polymerization in the presence of an organic solvent. These polymerization methods, however, are performed in the absence of oxygen, water, and other compounds that may act as catalyst poisons.

For liquid phase slurry polymerizations, the concentration of the solid complex titanium catalyst (i) with respect to the polymerization reaction system is approximately 0.001–5 mmol, in terms of titanium atoms in catalyst, per one liter of solvent, or more preferably approximately 0.001–0.5 mmol. Solvents that can be used include alkanes such as pentane, hexane, heptane, n-octane, isooctane, cyclohexane, and methylcyclohexane; alkylaromatics such as toluene, xylene, ethylbenzene, isopropylbenzene, ethyltoluene, n-propylbenzene, and diethylbenzene; halogenated aromatics such as chlorobenzene, chloronaphthalene, and ortho-dichlorobenzene; and mixtures thereof.

For gas phase polymerizations, the concentration of the solid complex titanium catalyst (i) should be approximately 0.001–5 mmol, in terms of titanium atoms in catalyst, per one liter of the polymerization reactor, preferably approximately 0.001–1.0 mmol, or more preferably approximately 0.01–0.5 mmol. The preferable concentration of the organometallic compound (ii), as calculated based on the metal atom, is about 1–2,000 moles per mole of titanium atoms in catalyst (i), or more preferably about 5–500 moles.

To provide a high reaction rate of polymerization, the polymerization is performed at a sufficiently high temperature regardless of the polymerization process. Generally, a temperature of approximately 20–200° C. is appropriate, or more preferably approximately 20–95° C. The appropriate pressure of monomer at the time of polymerization is about 1 atm to about 100 atm, or more preferably about 2 atm to about 50 atm.

Changes in the molecular weight according to the amount of hydrogen consumption at the time of polymerization are indicated by the melt index (ASTM D 1238), as is generally known in the art. The value of the melt index generally increases as the molecular weight decreases.

The products obtained by the method of polymerization are solid ethylene homo-polymers or the copolymers of ethylene and an α-olefin and exhibit excellent bulk density and fluidity. Since the yields of polymer are sufficiently high, there is no need for the removal of catalyst residues.

The present invention is described by means of the examples and comparative examples as below but should not be confined or limited to these examples.

EXAMPLES AND COMPARATIVE EXAMPLES

Example 1

A solid complex titanium catalyst was produced using the following three steps:

(i) Production of a Magnesium Solution

A 1.0 L reactor equipped with a mechanical stirrer was purged with nitrogen followed by the addition of 9.5 g of $MgCl_2$ and 200 ml of decane. After stirring at 300 rpm, 70 ml of 2-ethyl hexanol was added to the reactor. The temperature was raised to 120° C., and the reaction was allowed to continue for three hours. A homogenous solution was obtained and cooled to room temperature. 100 ml of mineral oil (Kaydol produced by Witco, Inc. (US); a white mineral oil with a viscosity of 63–70 centistoke at 40° C.) was added thereto, followed by stirring for one hour.

(ii) Contact-reaction of the Magnesium Solution with an Ester Containing a Hydroxyl Group and an Alkoxy Silane Compound 1.4 ml of 2-hydroxyethyl methacrylate and 14.0 ml of silicon tetraethoxide were added to the cooled magnesium solution. The reaction was allowed to continue for an hour.

(iii) Treatment of the Mixture with a Titanium Compound and a Silicon Compound

Into the above solution, a solution of 50 ml of titanium tetrachloride and 50 ml of silicon tetrachloride was dripped into the reactor over the course of one hour at room temperature. After completing the dripping process, the temperature of the reactor was raised to 70° C., while stirring, and maintained at that temperature for one hour. The temperature of the reactor was then lowered to room temperature and stirring was stopped. The supernatant of the solution was removed and the remaining solid layer was mixed with 300 ml of decane and 300 ml of titanium tetrachloride. The temperature was then raised to 100° C. and maintained for two hours. After the reaction, the reactor was cooled to room temperature. 400 ml of hexane was added to the reactor for the removal of free unreacted titanium tetrachloride. The titanium content of the solid catalyst so produced was 5.6 wt %.

Polymerization

A 2-L high-pressure reactor was dried in an oven and assembled while hot. To completely purge the reactor, the reactor was filled with nitrogen and evacuated three times. The reactor was then filled with 1,000 ml of n-hexane followed by 1 mmol of triethylaluminum and 0.03 mmol, in terms of titanium atoms, of the above solid catalyst. 2,000 ml of hydrogen was then added. The temperature of the reactor was raised to 80° C. while stirring at 700 rpm. The pressure of ethylene was adjusted to 100 psi and the polymerization was allowed to continue for an hour. After the polymerization, the temperature of the reactor was lowered to room temperature and an excess of ethanol was added to the reactor contents. The polymer thus produced was collected by separation and was dried in an oven at 50° C. for at least six hours, whereby polyethylene was obtained in the form of a white powder.

The polymerization activity (kg of polyethylene produced divided by gram of catalyst) was calculated as the weight (kg) ratio of the polymers produced to the amount of catalyst so used (gram of catalyst). The results of the polymerization are shown in Table 1 along with the polymer bulk density (g/ml) and melt index (g/10 minutes).

Example 2

As in step (i) of Example 1, 100 ml of decane was used to produce a magnesium solution under the same conditions. 200 ml of mineral oil was then added to adjust the solution viscosity. The catalyst was produced as in Example 1. The titanium content of the catalyst thus produced was 5.2 wt %. The polymerization was carried out as in Example 1. The results are shown in Table 1.

Example 3

As in step (i) of Example 1, 150 ml of decane was used to produce a magnesium solution under the same conditions. 150 ml of mineral oil was then added to adjust the solution viscosity. The catalyst was produced as in Example 1. The titanium content of the catalyst thus produced was 4.8 wt %. The polymerization was carried out as in Example 1. The results are shown in Table 1.

Example 4

As in step (i) of Example 1, 200 ml of decane with 100 ml of mineral oil were used to produce a magnesium solution under the same conditions. The catalyst was then produced as in Example 1. The titanium content of the catalyst thus produced was 5.1 wt %. The polymerization was carried out as in Example 1. The results are shown in Table 1.

Comparative Example 1

As in step (i) of Example 1, 300 ml of decane was used to produce a magnesium solution under the same conditions. The catalyst was then produced as in Example 1 without adding mineral oil. The titanium content of the catalyst thus produced was 4.8 wt %. The polymerization was carried out as in Example 1. The results are shown in Table 1.

TABLE 1

| | Results of Polymerization | | | | | | | | |
|---|---|---|---|---|---|---|---|---|---|
| Example | Activity (kg PE/g of catalyst) | Bulk Density (g/ml) | Melting Index (g/10 min) | Distribution of Polymer Particles (wt %) | | | | | |
| | | | | 840 $\mu$m | 500 $\mu$m | 250 $\mu$m | 177 $\mu$m | 105 $\mu$m | 74 $\mu$m | <44 $\mu$m |
| 1 | 4.1 | 0.40 | 3.52 | 0.0 | 0.2 | 3.4 | 21.2 | 63.8 | 10.8 | 0.6 |
| 2 | 4.2 | 0.39 | 3.73 | 0.0 | 0.4 | 4.8 | 27.2 | 51.0 | 15.4 | 1.2 |
| 3 | 4.0 | 0.41 | 3.67 | 0.0 | 0.0 | 7.2 | 24.8 | 49.2 | 17.2 | 0.8 |
| 4 | 4.0 | 0.39 | 3.83 | 0.0 | 0.3 | 6.9 | 22.9 | 54.3 | 14.9 | 0.7 |
| CE* 1 | 3.8 | 0.36 | 3.21 | 1.2 | 8.6 | 12.4 | 17.8 | 44.8 | 12.8 | 2.4 |

*CE: Comparative Examples

As shown above, by way of the production process, it is possible to produce a new catalyst of high polymerization activity for homo- and co-polymerization of ethylene, which can produce polymers with a high bulk density and few fine particles.

What is claimed is:

1. A method for producing a catalyst for homo- or co-polymerization of ethylene, comprising the steps of:
   (i) preparing a magnesium solution by contact-reacting a halogenated magnesium compound with an alcohol and then adding mineral oil thereto;
   (ii) reacting the magnesium solution with electron donors, the electron donors comprising an ester compound having at least one hydroxyl group and a first silicon compound having at least one alkoxy group; and
   (iii) reacting the mixture resulting from the reaction of the magnesium compound solution with electron donors with a mixture of a titanium compound and a second silicon compound.

2. The method of claim 1, wherein the mineral oil is a white oil, a paraffinic hydrocarbon oil, or a silicone oil.

3. The method of claim 1, wherein the ester compound having at least one hydroxyl group is an unsaturated aliphatic acid ester having at least one hydroxyl group, an aliphatic monoester or polyester having at least one hydroxyl group, an aromatic ester having at least one hydroxyl group, or an alicyclic ester having at least one hydroxyl group.

4. The method of claim 1, wherein the titanium compound is represented by a general formula of $Ti(OR)_aX_{4-a}$, wherein R comprises a hydrocarbon group, X comprises a halogen atom, and a is a natural number of 0–4.

5. The method of claim 1, wherein the titanium compound is a 4-halogenated titanium, a 3-halogenated alkoxytitanium, a 2-halogenated alkoxytitanium, a tetralkoxytitanium, or mixtures thereof.

6. The method of claim 1, wherein the titanium compound is titanium tetrachloride, and the second silicon compound is silicon tetrachloride.

7. The method of claim 1, wherein the ester compound having at least one hydroxyl group is 2-hydroxy ethylacrylate, 2-hydroxy ethylmethacrylate, 2-hydroxy propyl acrylate, 2-hydroxy propylmethacrylate, 4-hydroxy butylacrylate, pentaerythritol tri-acrylate, 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxymethyl) malonate, 2-hydroxy ethyl benzoate, 2-hydroxy ethyl salicylate, methyl-4-(hydroxy methyl) benzoate, methyl-4-hydroxy benzoate, ethyl-3-hydroxy benzoate, 4-methyl salicylate, ethyl salicylate, phenyl salicylate, propyl-4-hydroxy benzoate, phenyl 3-hydroxy naphthanoate, monoethylene glycol monobenzoate, diethylene glycol monobenzoate, triethylene glycol monobenzoate, or hydroxy butyl lactone.

8. The method of claim 1, wherein the first silicon compound having at least one alkoxy group is dimethyldimethoxysilane, dimethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butytriethoxysilane, phenyltriethoxysilane, ethyltriisopropoxysilane, vinyltributoxysilane, ethylsilicate, butylsilicate, or a methyltriaryloxysilane.

9. The method of claim 1, wherein the second silicon compound is represented by a general formula of $R_nSiCl_{4-n}$, wherein R comprises hydrogen, or an alkyl, alkoxy, haloalkyl, or aryl group having 1–10 carbons, or a halosilyl or halosilylalkyl group having 1–8 carbons; and n is a natural number of 0–3.

10. The method of claim 1, wherein the titanium compound is $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9)Br_3$, $Ti(OCH_3)_2Cl_2$, $Ti(OC_2H_5)_2Cl_2$, $Ti(O(i-C_4H_9))_2Cl_2$, $Ti(OC_2H_5)_2Br_2$, $Ti(OCH_3)_4$, $Ti(OC_2H_5)_4$, $Ti(OC_4H_9)_4$, or a mixture thereof.

11. The method of claim 1, wherein the second silicon compound is a trichlorosilane, a dichlorosilane, a monochlorosilane, or a mixture thereof.

12. The method of claim 1, wherein the second silicon compound is silicon tetrachloride, methyltrichlorosilane, ethyltrichlorosilane, phenyl-trichlorosilane, dimethyldichlorosilane, diethyldichlorosilane, diphenyldichlorosilane, methylphenyldichlorosilane, trimethylchlorosilane, or a mixture thereof.

* * * * *